United States Patent
Cordón Urbiola

(10) Patent No.: US 9,587,852 B2
(45) Date of Patent: Mar. 7, 2017

(54) EXCHANGER FOR HEATING BOILERS

(71) Applicant: Jose Luis Cordón Urbiola, Sartaguda (ES)

(72) Inventor: Jose Luis Cordón Urbiola, Sartaguda (ES)

(*) Notice: Subject to any disclaimer, the term of this patent is extended or adjusted under 35 U.S.C. 154(b) by 0 days.

(21) Appl. No.: 14/904,477

(22) PCT Filed: Jul. 10, 2014

(86) PCT No.: PCT/ES2014/000117
§ 371 (c)(1),
(2) Date: Jan. 12, 2016

(87) PCT Pub. No.: WO2015/004292
PCT Pub. Date: Jan. 15, 2015

(65) Prior Publication Data
US 2016/0146500 A1 May 26, 2016

(30) Foreign Application Priority Data
Jul. 12, 2013 (ES) .................................. 201331066

(51) Int. Cl.
*F28F 1/04* (2006.01)
*F24H 1/14* (2006.01)
(Continued)

(52) U.S. Cl.
CPC ............... *F24H 1/145* (2013.01); *F24H 8/00* (2013.01); *F24H 9/0026* (2013.01); *F28D 7/085* (2013.01);
(Continued)

(58) Field of Classification Search
CPC .. F24H 9/0026; F28D 2001/0266; F28F 1/04; H01M 10/647
(Continued)

(56) References Cited

U.S. PATENT DOCUMENTS

| 1,115,614 | A | * | 11/1914 | Swift | ..................... | F23D 91/02 |
| | | | | | | 122/213 |
| 4,347,810 | A | * | 9/1982 | Rees | ..................... | F22B 37/645 |
| | | | | | | 122/510 |

(Continued)

FOREIGN PATENT DOCUMENTS

| ES | 2136609 T3 | 12/1999 |
| ES | 1074723 U | 6/2011 |

(Continued)

OTHER PUBLICATIONS

International Search Report for corresponding International Application No. PCT/ES2014/000117.

*Primary Examiner* — Gregory A Wilson
(74) *Attorney, Agent, or Firm* — Egbert Law Offices, PLLC

(57) ABSTRACT

An exchanger for heating boilers is formed of an external prismatic framework, a burner and an exhaust duct, characterized in that it includes a block of tubes formed of a plurality of tube sections positioned against one another horizontally and vertically, separated at equal distances from one another and integrated in a prismatic housing creating between them a closed circuit of water, leaving the tube sections free, forming different levels separated by deflectors in order to control the inflow and outflow of the gases produced by combustion, directing the gases as desired through the different levels, capturing the heat along the path of the gases in order to quickly heat the water in the circuit without losing calories and reducing fuel consumption as much as possible.

2 Claims, 4 Drawing Sheets

(51) Int. Cl.
*F28F 9/22* (2006.01)
*F28F 9/00* (2006.01)
*F28D 7/16* (2006.01)
*F24H 9/00* (2006.01)
*F28D 7/08* (2006.01)
*F24H 8/00* (2006.01)
*F28D 21/00* (2006.01)

(52) U.S. Cl.
CPC ............. *F28D 7/16* (2013.01); *F28D 7/1623* (2013.01); *F28D 7/1661* (2013.01); *F28D 7/1684* (2013.01); *F28D 7/1692* (2013.01); *F28F 1/04* (2013.01); *F28F 9/001* (2013.01); *F28F 9/22* (2013.01); *F28D 2021/0024* (2013.01)

(58) Field of Classification Search
USPC ...... 122/18.1, 19.1, 30, 37, 209.1, 213, 214, 122/223, 224, 225 A, 355
See application file for complete search history.

(56) References Cited

U.S. PATENT DOCUMENTS

| | | | |
|---|---|---|---|
| 6,957,695 B2 | 10/2005 | Lomax et al. | |
| 2012/0247732 A1* | 10/2012 | Suzuki | F28F 7/02 165/104.14 |
| 2013/0115505 A1* | 5/2013 | Xie | H01M 2/027 429/120 |
| 2014/0087231 A1* | 3/2014 | Schaefer | H01M 10/5053 429/120 |

FOREIGN PATENT DOCUMENTS

| | | | | |
|---|---|---|---|---|
| GB | 1113749 A | | 5/1968 | |
| GB | 1391613 A | * | 4/1975 | ............. F22B 37/36 |
| GB | 2103351 A | | 2/1983 | |
| GB | 2178513 A | | 11/1987 | |
| JP | 62009183 A | * | 1/1987 | |

* cited by examiner

EXCHANGER FOR HEATING BOILERS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to an exchanger for heating boilers of those formed of an external prismatic framework, a burner and an exhaust duct, characterized by comprising a block of tubes formed of a plurality of tube sections positioned against one another horizontally and vertically, separated at equal distances from one another and integrated in a prismatic housing, creating between them a closed circuit of water, leaving the tube sections free, forming different levels separated by deflectors in order to control the inflow and outflow of the gases produced by combustion, directing said gases as desired through the different levels, capturing the heat along the path of the gases in order to quickly heat the water in the circuit without losing calories and reducing fuel consumption as much as possible and thereby making the exchanger more environmentally friendly.

The invention disclosed has the advantage of providing a high heating efficiency with any type of fuel, as well as an increased lifetime as no maintenance is required.

2. Description of Related Art Including Information Disclosed Under 37 CFR 1.97 and 37 CFR 1.98.

All boilers consist of three parts: the burner, where combustion takes place and energy is released from the fuel; the exhaust, where combustion gases escape; and the boiler body or boiler itself, which is the vessel in which the heat exchange occurs and therefore where the water is heated.

A new technology is currently being implemented for saving fuel in boilers based on using any available opportunity to ensure using all the energy stored in the fuel, reducing heat losses when heating the water as much as possible to obtain high efficiencies.

This is achieved by several simple methods, one of which is using the latent heat of condensation, using the energy released by water when changing state from gas to liquid.

When combustion takes place steam is generated naturally. Old boilers wasted this steam by simply releasing it through the gas exhaust duct as if it were as useless gas; however, new condensation boilers use this steam, condensing it and using the energy obtained in the process to heat the water contained in the boiler.

To increase efficiency even further, some boilers limit the water temperature to about 50° C. This option increases the start-up time of the boiler but considerably reduces its consumption as a low power is required, as well as promoting condensation.

According to the energy saving technology of patent ES2136609 a heating installation is disclosed that comprises a condensation catalyst that uses latent heat such that hot exhaust gases or fumes circulating in the condensation catalyst transfer their heat to the heating system water.

Another solution is provided in Spanish utility model U201130149, which describes a rustic stove formed of a rectangular prismatic body where at least the part considered the front has a zig-zag profile having a staggered profile which provides a means for deriving the heat generated by combustion, generally of wood, placed at a lower area of the stove body.

BRIEF SUMMARY OF THE INVENTION

To provide a solution that provides significant saving of energy an exchanger for heating boilers has been designed characterized by comprising a block of tubes formed of a plurality of tube sections positioned against one another horizontally and vertically, separated at equal distances from one another and integrated in a prismatic housing with deflectors.

The block of tubes does not require any maintenance but can be removed to be cleaned or replaced.

The prismatic housing comprises two side walls folded at 90° and two base walls, front and rear, that incorporate recesses coinciding with the plurality of tube sections, which are inserted in the ends thereof, creating an inner chamber meant for the water circuit, incorporating on the top part thereof a connection for the hot water outlet and a bottom connection for the cold water inlet.

The deflectors consist of a rectangular plate that can be moved as desired through side walls vertically positioned at the four ends of the prismatic housing. The deflectors can be oriented to increase or reduce the travel time of the gases inside the tubular block.

When the burner flame is produced with any type of fuel, gases and fumes are generated instantaneously in the combustion. Said gases, directed by the position of the deflectors, rise and alternately enter and exit the various levels of tubes, transmitting the heat to the water circuit in the inner chamber and heating the water quickly, as the gases travel several meters until they are expelled through the gas exhaust duct.

By using the combustion gases and fumes through the circuit created by the various levels of tubes, a high efficiency is achieved as the water is heated simultaneously to start-up, resulting in significant energy savings.

Advantages of the Invention

The heat exchanger for heating boilers of the invention disclosed herein provides several advantages over currently available exchangers, the most important one being that it comprises a plurality of tube sections horizontally and vertically positioned against one another and integrated in a prismatic housing, creating an inner chamber for the closed water circuit, having on the top part thereof a connection for hot water outlet and a bottom connection for water inlet.

Another no less important advantage is that the exchanger incorporates deflectors placed between side walls arranged vertically on the ends of the prismatic casing, which can be moved as desired.

Another important advantage is that the arrangement of the various levels of tubes separated by the deflectors create a conduct for alternate passage of the gases and fumes produced by combustion, heating the water simultaneously with the start-up and providing significant energy savings.

Lastly, a further advantage is that the exchanger is maintenance free and can be removed to be replaced or cleaned.

BRIEF DESCRIPTION OF THE DRAWINGS

To aid a better understanding of the subject matter of the present addition, the accompanying set of drawings represents a preferred practical embodiment thereof.

In said drawings

DETAILED DESCRIPTION OF THE INVENTION

Preferred Embodiment of the Invention

Figure 1:
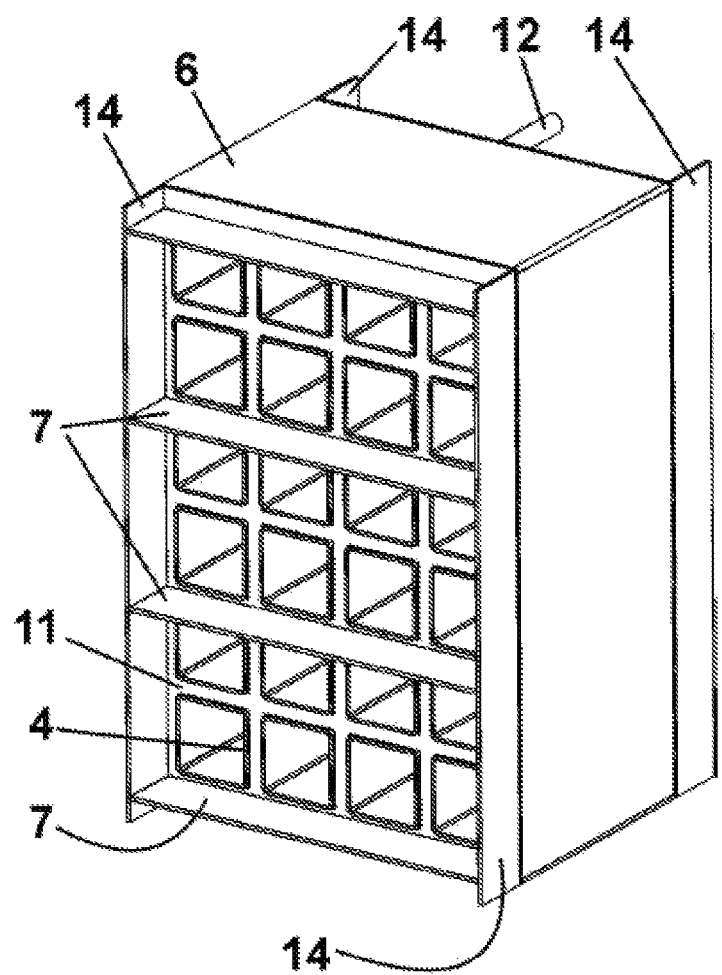
FIG. 1 shows a perspective view of the exchanger for heating boilers.
Figure 2:
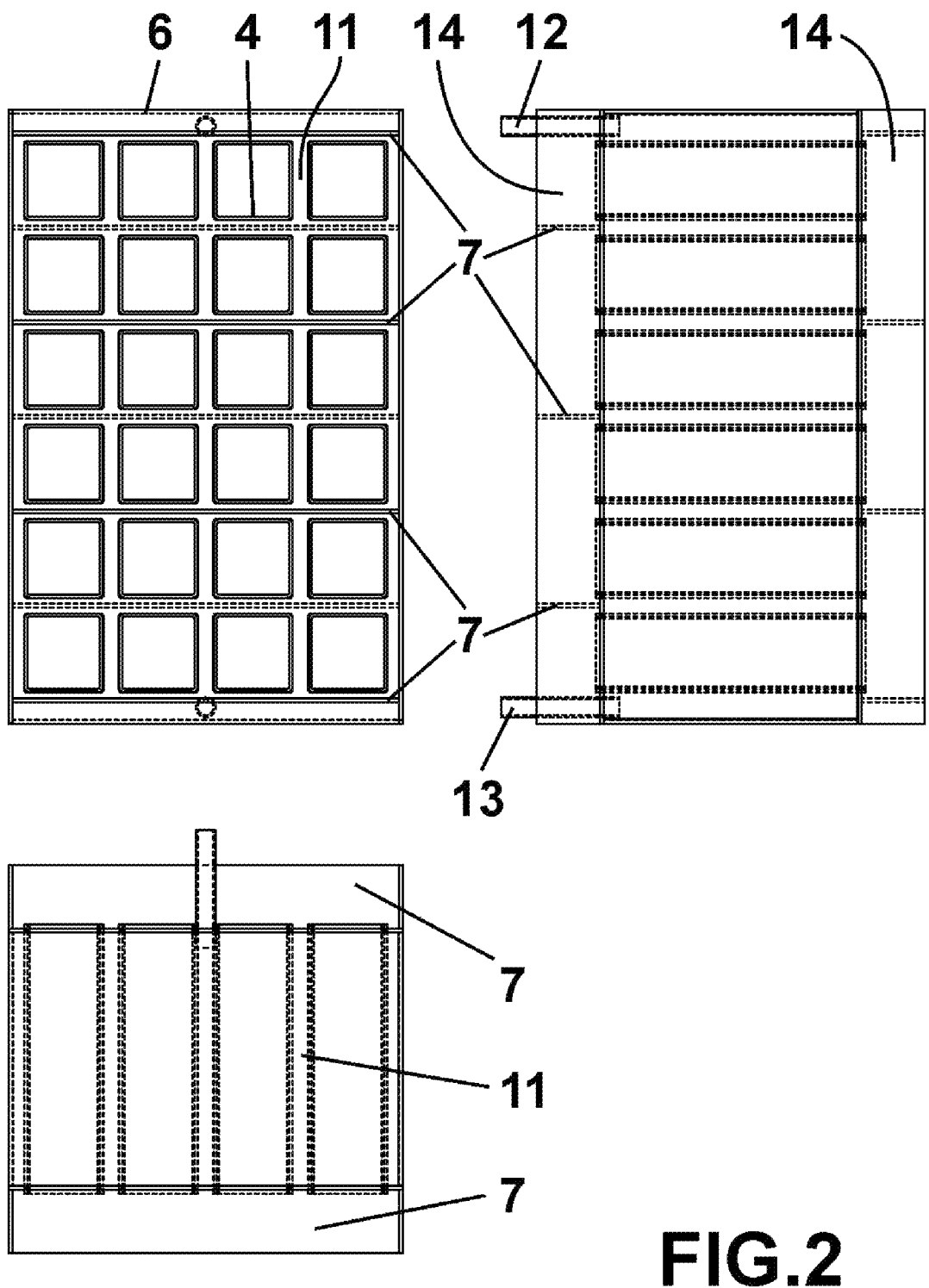
FIG. 2 shows a plan, elevation and profile view of the exchanger for heating boilers.
Figure 3:
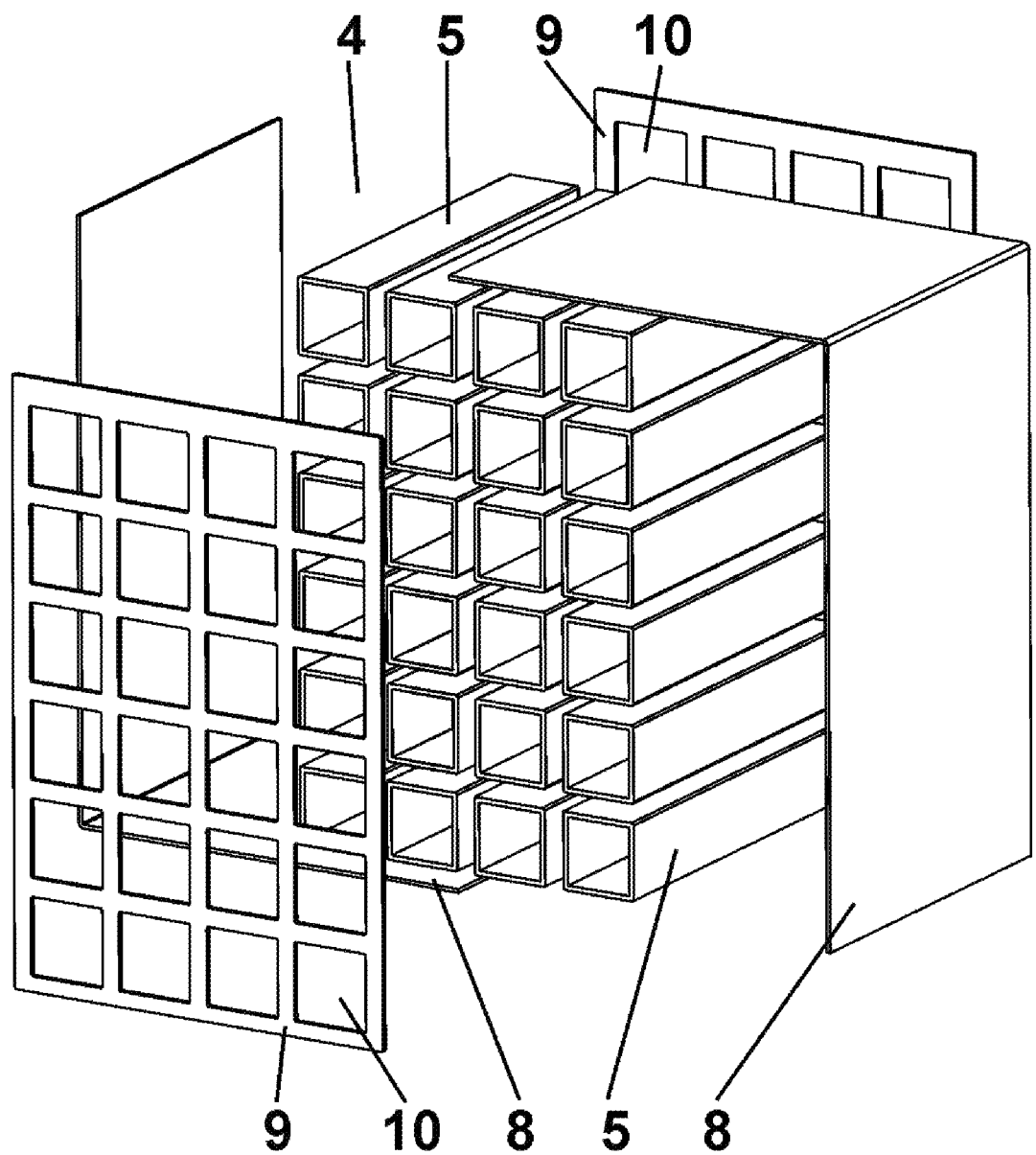
FIG. 3 shows a cross-sectional view of a boiler with the exchanger of the invention, showing the cycle of gases and fumes through the various levels formed by the tube sections.
Figure 4:
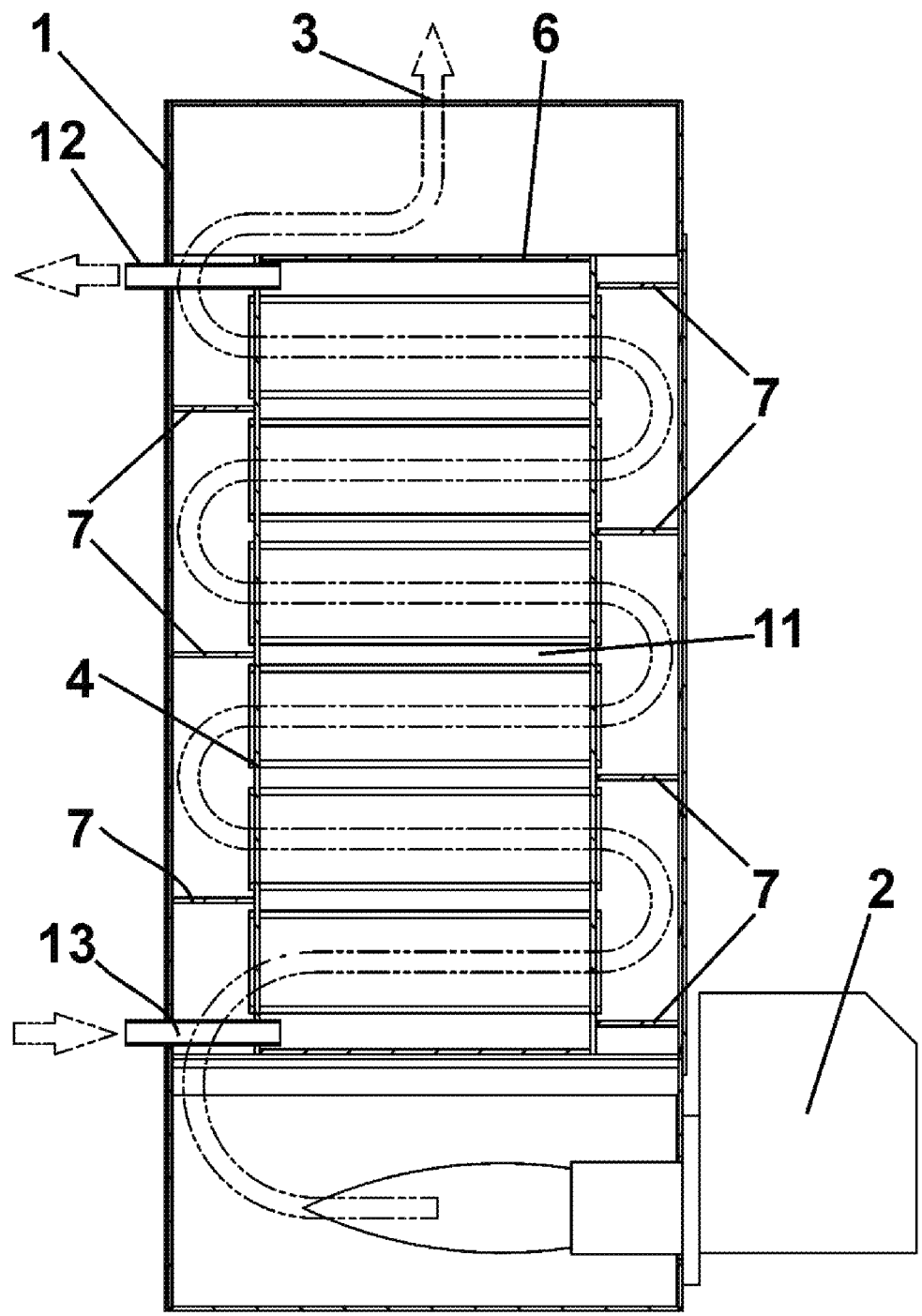
FIG. 4 is a cross-section of the heat exchange system of the present invention.

The exchanger for heating boilers consisting of an external prismatic framework (1), a burner (2) and a gas exhaust (3) is characterized by comprising a block of tubes (4) configured by a plurality of tube sections (5) positioned horizontally and vertically against one another, separated by equal distances and integrated in a prismatic housing (6) with deflectors (7).

The prismatic housing (6) comprises two side walls (8) folded at 90° and two front and rear walls (9) provided with recesses (10) coinciding with the plurality of tube sections (5), which are inserted in said recesses at the ends thereof, defining an inner chamber (11) meant for the water circuit, incorporating at its top part a hot water outlet connection (12) and a bottom cold water inlet connection (13).

The deflectors (7) consist of a rectangular plate that can be moved as desired through side walls (14) vertically positioned against the four ends of the prismatic housing (6).

The invention claimed is:

1. A heat exchanger apparatus for a heating boiler, the heat exchanger apparatus comprising:
   an external prismatic framework;
   a burner adapted to introduce heat into said external prismatic framework;
   a gas exhaust for releasing gas from said external prismatic framework;
   a prismatic housing located within said external prismatic framework, said prismatic housing having a pair of side walls in which each wall of said pair of side walls is folded at 90° and a front wall and a rear wall;
   a block of tubes formed of a plurality of tube sections positioned against one another horizontally and vertically and separated at equal distances from one another, said block of tubes being integrated in said prismatic housing;
   a plurality of deflectors each formed of a rectangular plate, said plurality of deflectors being adjustably positionable in a location in spaces aligned with a space between a row of said plurality of tube sections and a row of said plurality of tube sections immediately therebelow; and
   four vertical walls extending outwardly from said pair of side walls, one pair of said four vertical walls extending in spaced parallel relation to a front of said external prismatic framework and another pair of said four vertical walls extending in spaced parallel relation to a back of said external prismatic framework, at least one of said plurality of deflectors extending horizontally between said one pair of said four vertical walls, at least one of said plurality of deflectors extending horizontally between said another pair of four vertical walls.

2. The heat exchanger apparatus of claim 1, said front wall having recesses corresponding to ends of said plurality of tube sections, said rear wall having recesses corresponding opposite ends of said plurality of tube sections, the spaces between the rows of said plurality of tube sections defining a water circuit, said water circuit having a hot water outlet connection at a top thereof and a cold water inlet connection at a bottom thereof.

* * * * *